United States Patent
Ikeda et al.

(10) Patent No.: US 7,243,486 B1
(45) Date of Patent: Jul. 17, 2007

(54) CABLE PROTECTION AND GUIDE DEVICE

(75) Inventors: Masaaki Ikeda, Osaka (JP); Shoichiro Komiya, Osaka (JP); Takayuki Matsuda, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 11/522,718

(22) Filed: Sep. 18, 2006

(30) Foreign Application Priority Data

Dec. 27, 2005 (JP) .............................. 2005-375889

(51) Int. Cl.
*F16G 13/16* (2006.01)

(52) U.S. Cl. ............................ 59/78.1; 248/49; 248/51

(58) Field of Classification Search ................. 59/78.1; 248/49, 51
See application file for complete search history.

(56) References Cited

U.S. PATENT DOCUMENTS

| | | | | |
|---|---|---|---|---|
| 4,962,639 A | * | 10/1990 | Blase | 59/78.1 |
| 5,108,350 A | * | 4/1992 | Szpakowski | 59/78.1 |
| 5,157,913 A | * | 10/1992 | Wehler et al. | 59/78.1 |
| 5,996,330 A | * | 12/1999 | Ehmann et al. | 59/78.1 |
| 6,387,002 B1 | * | 5/2002 | Gunter | 59/78.1 |
| 6,688,096 B2 | * | 2/2004 | Wada et al. | 59/78.1 |
| 6,725,642 B2 | * | 4/2004 | Tsutsumi et al. | 59/78.1 |
| 6,745,555 B2 | * | 6/2004 | Hermey et al. | 59/78.1 |

FOREIGN PATENT DOCUMENTS

| | | |
|---|---|---|
| JP | 3356733 | 4/2001 |
| JP | 3356699 | * 12/2002 |

* cited by examiner

*Primary Examiner*—David Jones
(74) *Attorney, Agent, or Firm*—Woodling Krost and Rust

(57) ABSTRACT

A cable protection and guide device is disclosed which can reliably protect and guide cables without increasing and decreasing the width between link plates even if the height of the link plates of the cable protection and guide device is increased. The cable protection and guide device includes a number of link frame bodies each comprising a pair of right and left spaced link plates and upper and lower connecting rods respectively bridged on upper edge and lower edges of the link plates are connected to each other in the longitudinal direction of the device while restricting a flexion radius to a fixed value. A central connecting rod connects the pair of link plates at substantially the center portion along the height direction of the link plate. The central connecting rod is integrally molded with the pair of link plates.

3 Claims, 8 Drawing Sheets

CABLE PROTECTION AND GUIDE DEVICE

TECHNICAL FIELD

The present invention relates to a cable or the like protection and guide device (hereinafter referred to as only "cable protection and guide device), which safely and reliably protects and guides a flexible cable(s) or the like such as an electric cable (which connects a movable portion and a stationary portion to each other in an industrial machine, a vehicle and the like to transmit electric signals or supply power) and a hose, which supplies oil or air under pressure and the like.

BACKGROUND TECHNOLOGY

This type of the cable protection and guide device has a configuration that a number of link frame bodies each comprising a pair of right and left spaced link plates and upper and lower connecting rods respectively bridged on a flexion outer circumferential side and a flexion inner circumferential side of the link plate are connected to each other in the longitudinal direction of the device while restricting a flexion radius to a fixed value or more. Here, "the flexion outer circumferential side" and "the flexion inner circumferential side" respectively mean "a side positioned outside" and "a side positioned inside" when a link plate is flexed to form an arc. The flexion of the link plate is restricted so that it is permitted within a predetermined angle, See for example Japanese Patent Publication No. 3356733.

In a cable protection and guide device which the present applicant previously proposed and for which patent was filed, as disclosed in FIG. 6 as related art, a pair of right and left spaced link plates 310 and a lower connecting rod 320b are integrally molded of a resin material into a link frame body 300 by injection molding. And an upper connecting rod 320a has a hinge mechanism 334 at an end and a hook mechanism 332 and a locking pin 313 at the other end and is openably and pivotably provided on an upper edge end of the link plate 310. FIG. 7 shows three connected link frame bodies 300 shown in FIG. 6. See the specification of Japanese patent application No. 2005-285263.

PROBLEMS TO BE SOLVED BY THE INVENTION

However, in the above-mentioned cable protection and guide device that the present inventor previously filed, as shown in FIG. 6, the pair of link plates 310 and the lower connecting rod 320b are integrally molded by injection molding using a metal mold, when the height H of the link plate 310 is increased, new problems arise in that the upper portion of the link plate 310 is warped or bent outside as shown in FIG. 5(a) so that the upper connecting rod 320a cannot be closed. Also, when the upper portion of the link plate 310 is warped or bent inside as shown in FIG. 5(b) the upper connecting rod 320a cannot be closed.

Further, to protect and guide a number of cables when a conventional cable protection and guide device 300 is used, the height H of the link plate 310 is increased so that the warpage of the upper portion of the link plate 310 inside or outside the device is liable to occur. Therefore, in a case where the number of cables to be protected and guided must be increased, it is necessary to increase the height of the link plate 310. In this case to increase the rigidity of the link plate 310 it is necessary to increase the thickness of the link plate 310. Thus a problem has been pointed out that the link plate 310 is increased in size and the manufacturing costs are increased.

FIG. 7 is a perspective view shows a conventional guide having three link frame bodies 300 connected to each other. As can be seen from FIG. 7, for example a thick cable C1, which supplies electric power and thin cables C2 and C3, through which signals or the like are sent, cannot be protected and guided in a sorted manner. As a result, signal lines C2 and C3, which pass delicate signals of small amplitudes and the like, catch electromagnetic noises generated from a power cable C1 so that the signals carried in signal lines C2 and C3 are corrupted and a malfunction is generated in a machine which uses the signals for control purposes. Further, in a case where only one cable is replaced the cable must be pulled out from a number of cables and the maintenance is increased.

Furthermore, when a number of cables are accommodated in a conventional cable protection and guide device, the cables must be accommodated into link frame bodies in a laminated manner to avoid interference/corruption of the signals. Thus such a problem has been pointed out that in a case where signal lines and power supply lines should be accommodated so as not to overlap, a partitioning plate (not shown) must be attached between the upper connecting rod 320a and the lower connecting rod 320b and the number of parts is increased.

Accordingly, the object of the present invention is to provide a cable protection and guide device, which can reliably protect and guide cables without increasing and decreasing width between link plates even if the height of the link plates of the cable protection and guide device is increased.

MEANS FOR SOLVING THE PROBLEMS

The invention attains the above-mentioned object by a cable protection and guide device in which a number of link frame bodies each comprising a pair of right and left spaced link plates and upper and lower connecting rods are respectively bridged on an upper edge and a lower edge of the link plate. The rods are connected to each other in the longitudinal direction of the device while restricting a flexion radius to a fixed value. A central connecting rod, which connects the pair of link plates at substantially the center portion along the height direction of the link plate, is integrally molded with the pair of link plates.

The invention attains the above-mentioned object in that the upper connecting rod and the lower connecting rod each include a hinge mechanism at one end and a hook mechanism at the other end.

The invention attains the above-mentioned object in that the central connecting rod is molded in a wave shape in its cross-section.

EFFECTS OF THE INVENTION

According to the invention a cable protection and guide device in which a number of link frame bodies each comprising a pair of right and left spaced link plates and upper and lower connecting rods respectively bridged on upper and lower edges of the link plate are connected to each other in the longitudinal direction of the device while restricting a flexion radius to a fixed value. A central connecting rod connects the pair of link plates at substantially the center portion along the height direction of the link plate. The central connecting rod is integrally molded with the pair of link plates, the respective distances from the central connecting rod to the upper edge and lower edge of the link plate can be substantially conforms to the height of the link plate of a conventional cable protection and guide device. As a result the cable accommodation capacity can be substantially doubled.

According to the invention, since, in addition to the effects obtained by the invention and set forth above, the upper connecting rod and the lower connecting rod each includes a hinge mechanism at one end and a hook mechanism at the other end. The cable can be taken in and out from any one of a flexion outer circumferential side and a flexion inner circumferential side of the chain and at the same time space in the link frame body divided into two sections can be efficiently used. Namely, power cables for supplying electric, hoses for supplying air or liquid, signal lines for transmitting the output of a sensor or the like and the like can be sorted into the space divided into two sections.

According to the invention, since, in addition to the effects obtained by the invention set forth above, the central connecting rod is molded in a wave shape in its cross-section, and when the cable protection and guide device is moved, the cables can be suppressed from moving in a zigzag line or waving vertically.

The drawings will be better understood when reference is made to the Description Of The Invention and Claims which follow hereinbelow.

DESCRIPTION OF THE INVENTION

An example of an embodiment of the present invention will be described with reference to drawings.

EXAMPLE 1

Figure 1:
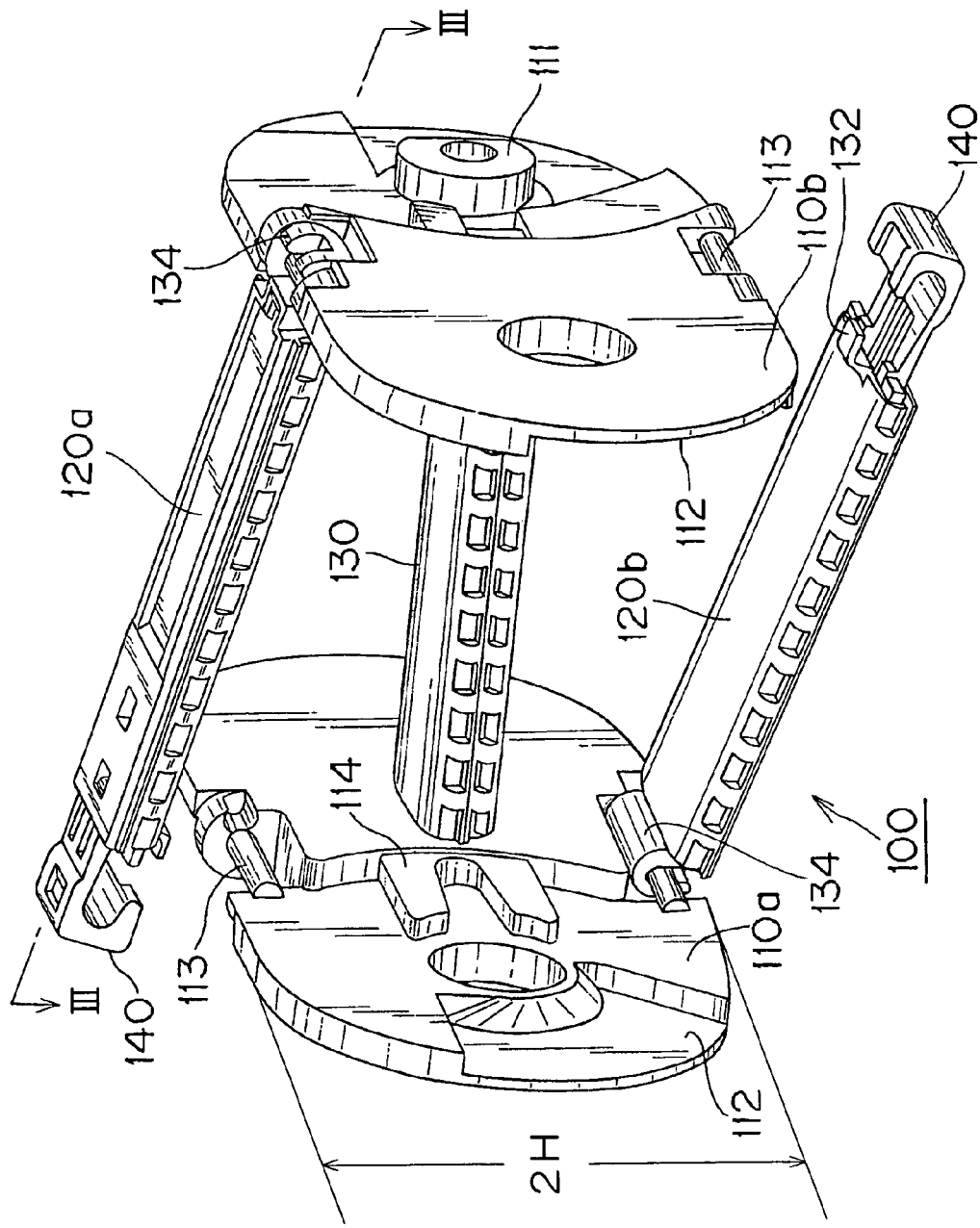
FIG. 1 is a perspective view showing a link frame body of a cable protection and guide device of example 1 according to the present invention.

FIG. 1 is a perspective view showing one of link frame bodies 100 forming the present invention. This link frame body 100 includes a pair of right and left spaced link plates 110a and 110b, an upper connecting rod 120a bridged on these link plates 110 (110a, 110b) and a lower connecting rod 120b bridged on these link plates 110 (110a, 110b). And a central connecting rod 130, which connects said pair of link plates 110a and 110b at a substantially center portion along the height direction, is integrally molded with the pair of link plates 110a and 110b by an injection molding process. Further, the upper connecting rod 120a and the lower connecting rod 120b each have a hinge mechanism 134 at one end and a hook mechanism 132 at the other end. It is noted that in FIG. 1, members denoted by reference numerals 113 are locking pins 113, which cooperate with the hook mechanism 132 to lock an opening end portion side of the upper connecting rod 120a and the lower connecting rod 120b. Locking pins 113 also pivotably lock a pivot portion side of the upper connecting rod 120a and the lower connecting rod 120b. Further, in FIG. 1, members denoted by reference numerals 140 are locking members which cooperate with the hook mechanisms 132 to reliably lock the upper connecting rod 120a and the lower connecting rod 120b to the link frame bodies 110a and 110b, respectively.

Figure 2:
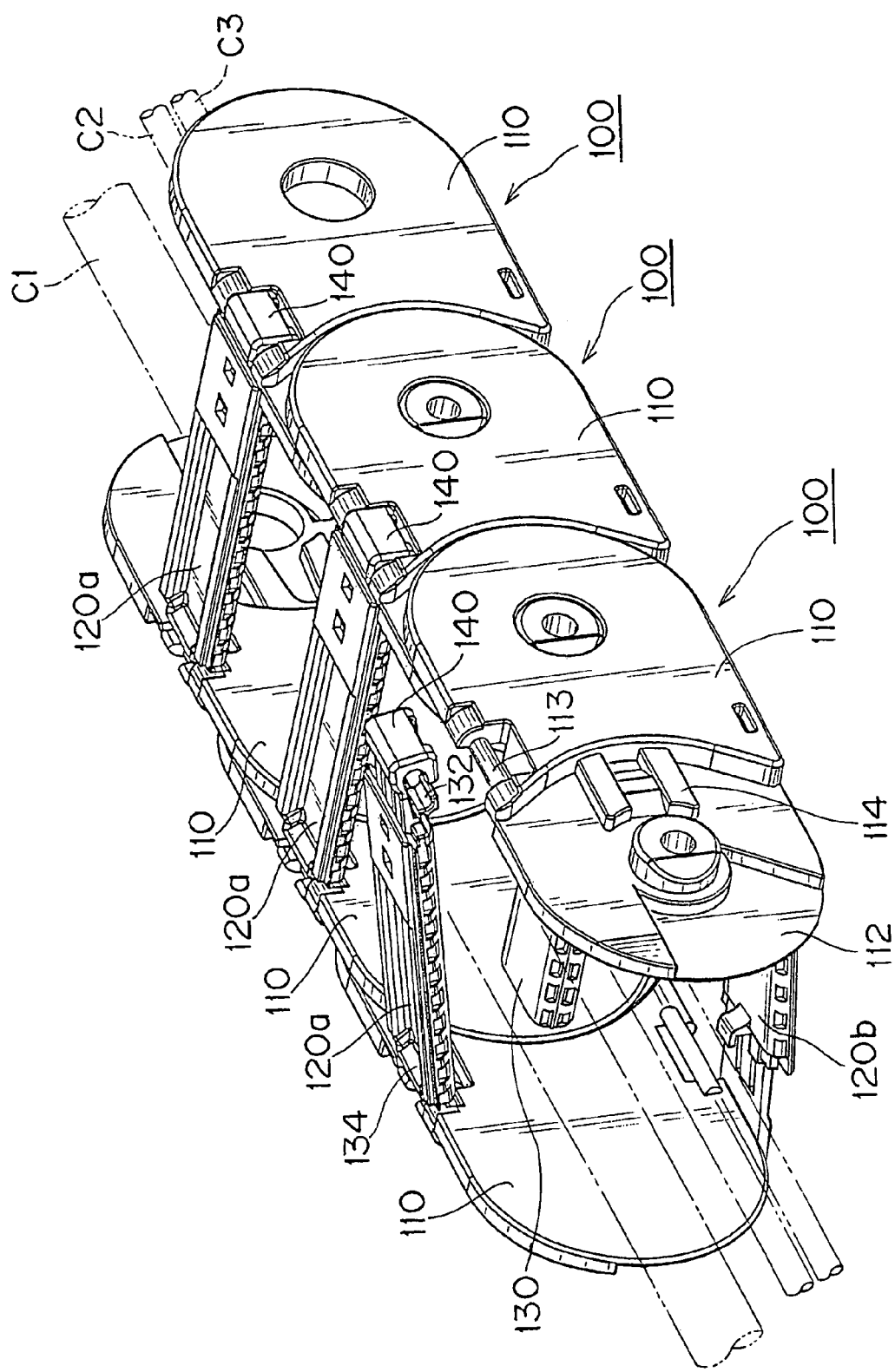
FIG. 2 is a perspective view showing three series of link frame bodies in the cable protection and guide device of the present invention in FIG. 1.

Further, when a thin-walled portion 112 and a convex portion 114 of a link frame body 100 are connected to another link frame body 100, the thin-walled portion 112 of the link plate 110 engages with a convex portion 114 of another link frame body 100 and the convex portion 114 engages with the thin-walled portion 112 of another link frame body 100, so that a flexion radius in the longitudinal direction is restricted to a fixed value. FIG. 2 is a perspective view showing a state where three series of link frame bodies 100 are connected to each other. As apparent from FIG. 2, for example a cable C1 having a large diameter, which supplies electric power, and cables C2 and C3 each having a comparatively small diameter, which pass signals and the like from a sensor, are sorted so that the cables can be protected and guided. In this case the signal lines C1 and C3, which pass delicate signals having small amplitudes, can be suppressed or shielded from catching electromagnetic noises generated from the power cable C1.

The material forming the link frame body 100 comprising the link plates 110 (110a, 110b), the upper connecting rod 120a, the lower connecting rod 120b and the central connecting rod 130 is not limited particularly. However, the link frame body 100 is preferably molded by use of a fiber-reinforced resin, which can exhibit excellent strength properties.

Figure 3:
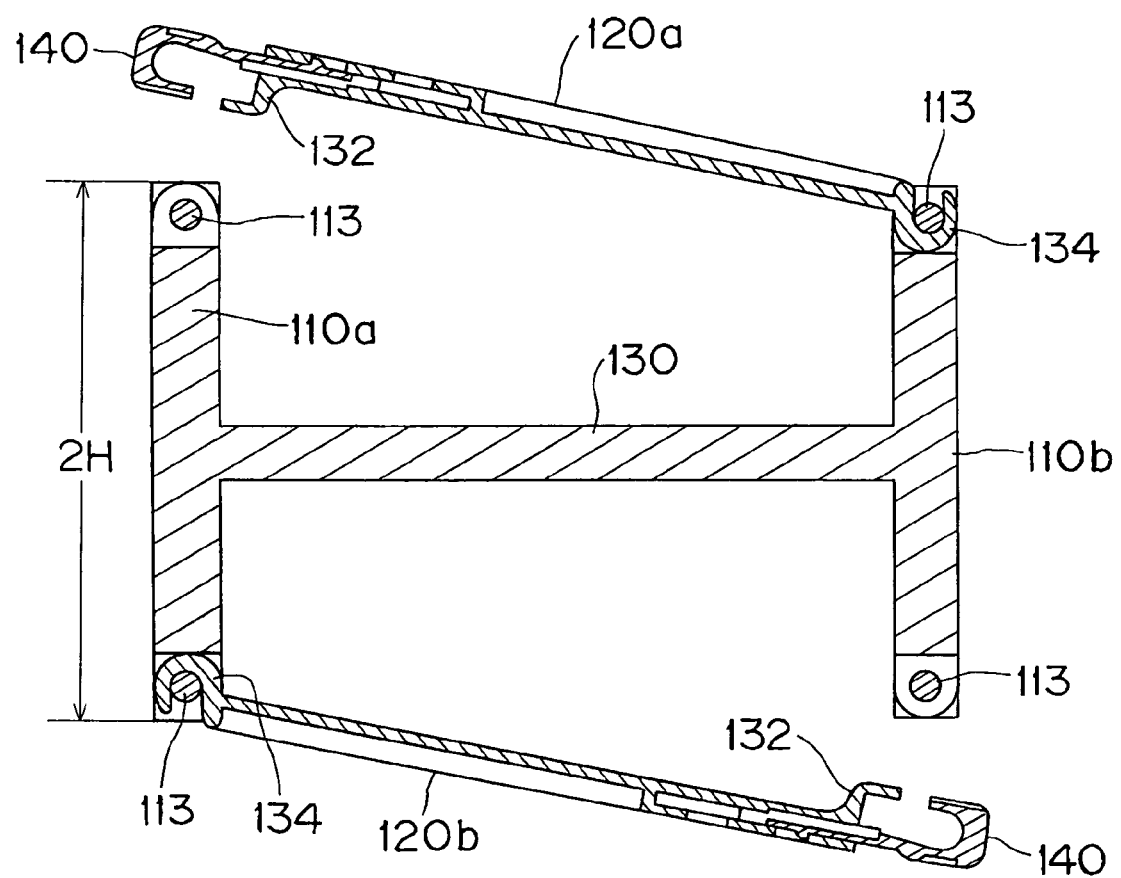
FIG. 3 is a cross-sectional view taken along the line III-III in FIG. 1.

FIG. 3 is a cross-sectional view taken along the line III-III in FIG. 1. The provision of the central connecting rod 130 which permits an increase in height H of the link plate and cable accommodation space sorted into upper and lower sections is illustrated. As apparent from FIG. 3, since the locking pins 113 are symmetrically formed on the upper end portion and the lower end portion, the upper connecting rod 120a and the lower connecting rod 120b can be adapted to be opened and closed in a right or left direction.

Next, another example of the embodiment of the present invention will be described with reference to FIG. 4.

EXAMPLE 2

Figure 4:
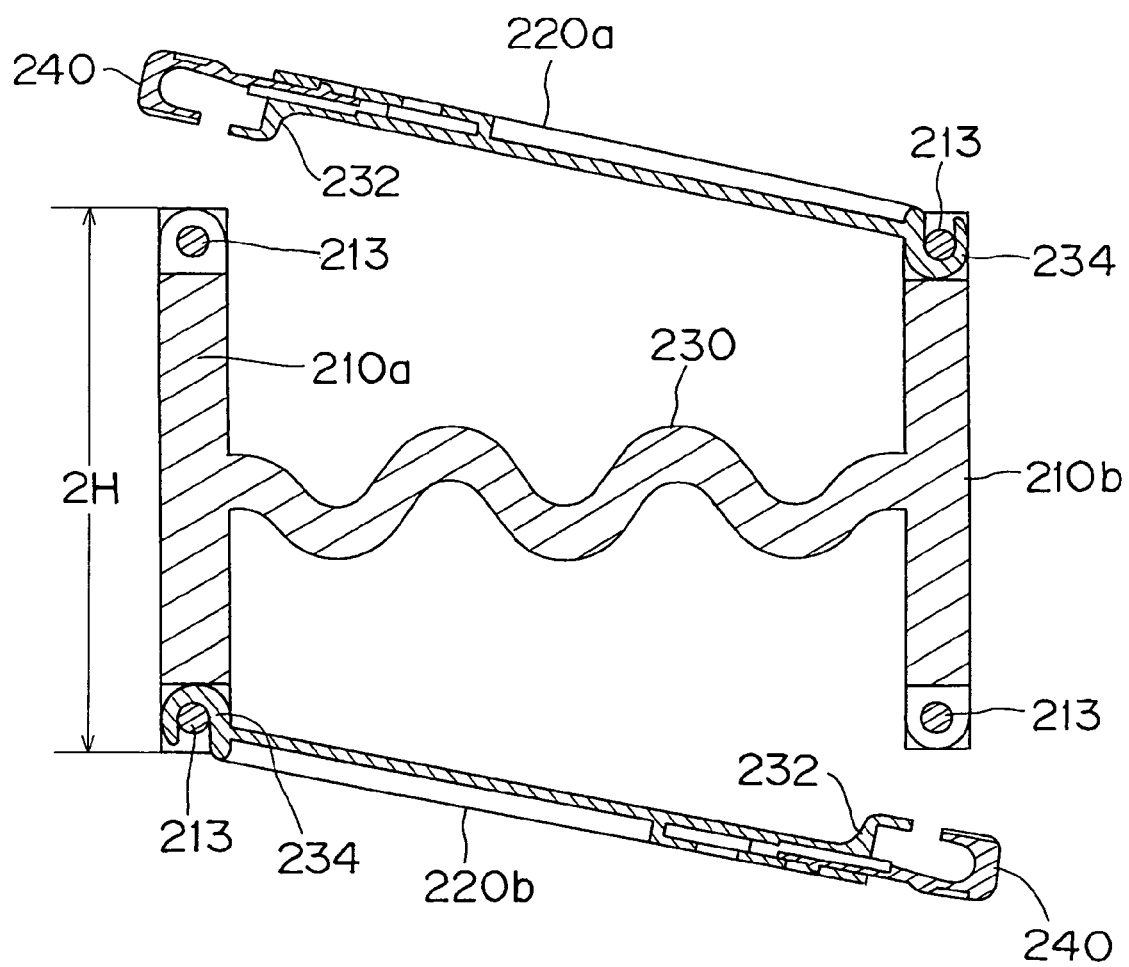
FIG. 4 is a perspective view showing a link frame body of a cable protection and guide device of example 2 according to the present invention.
Figure 5:
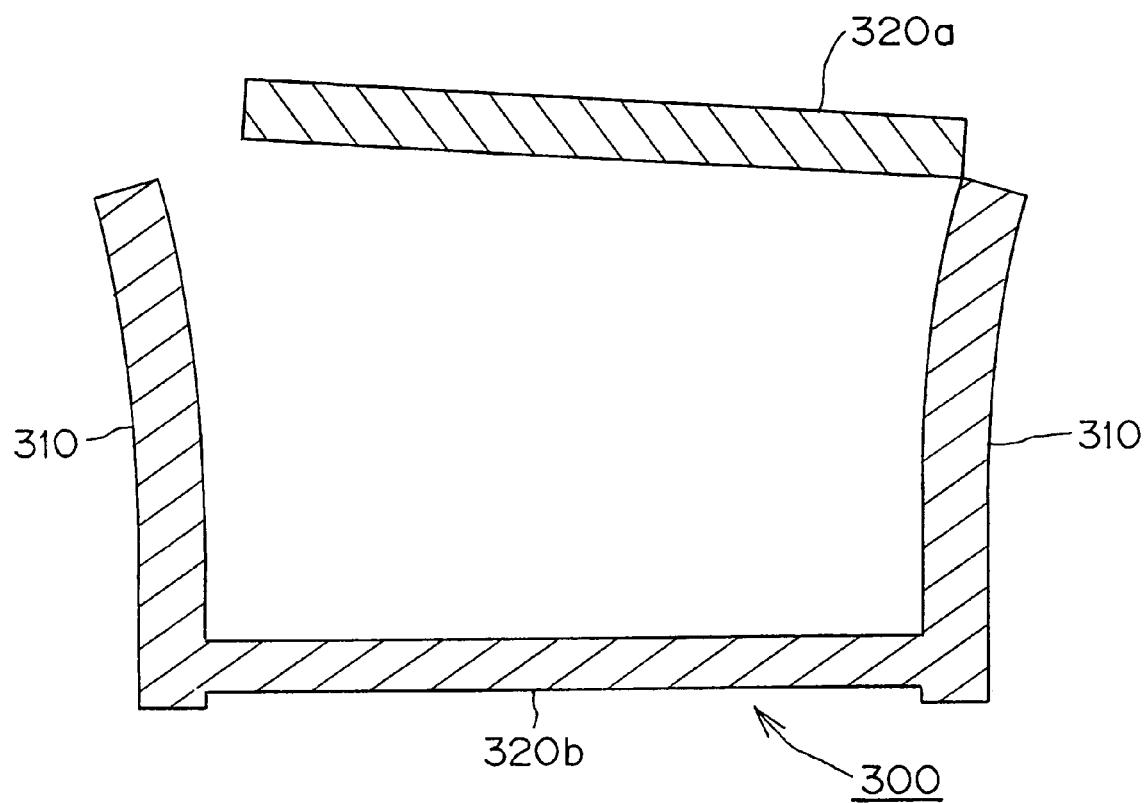
FIGS. 5(a) and 5(b) are schematic cross-sectional views explaining problems of a cable protection and guide device relating to the present invention.
Figure 5:
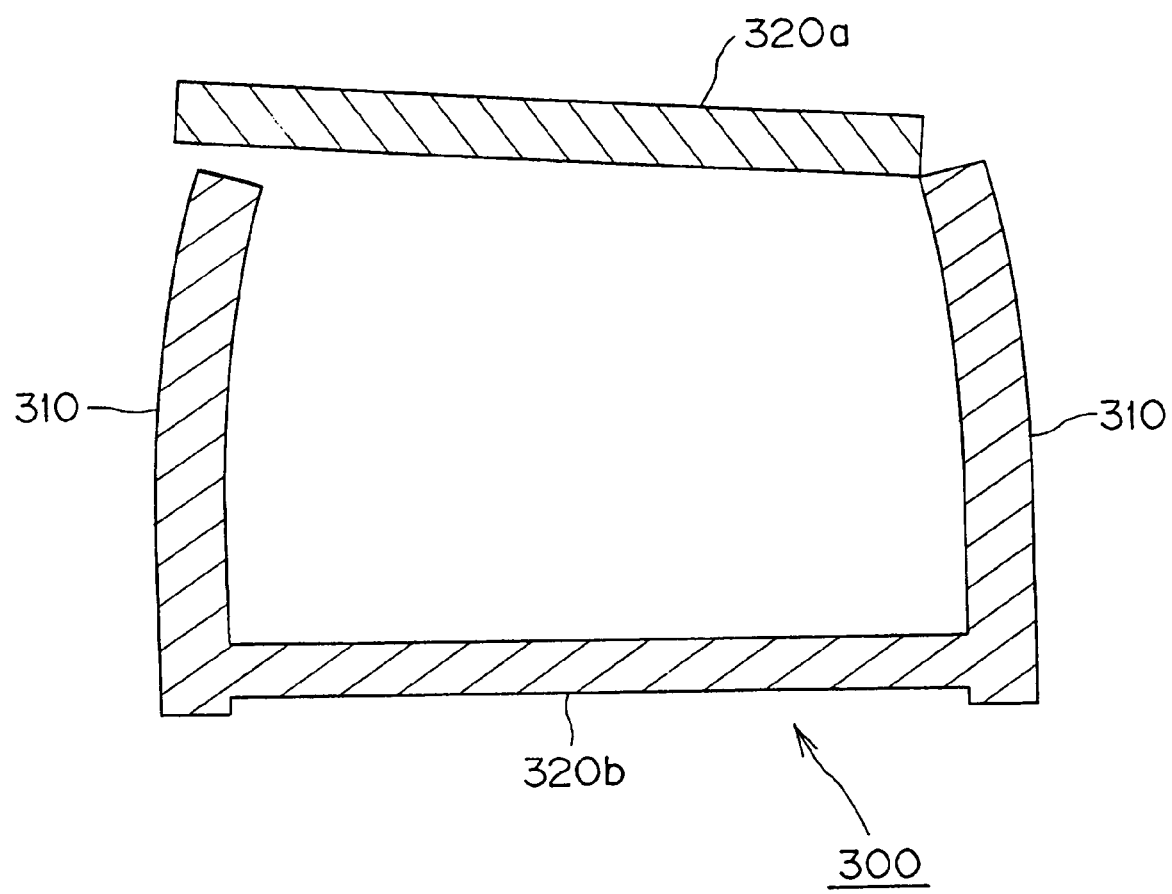
Figure 6:
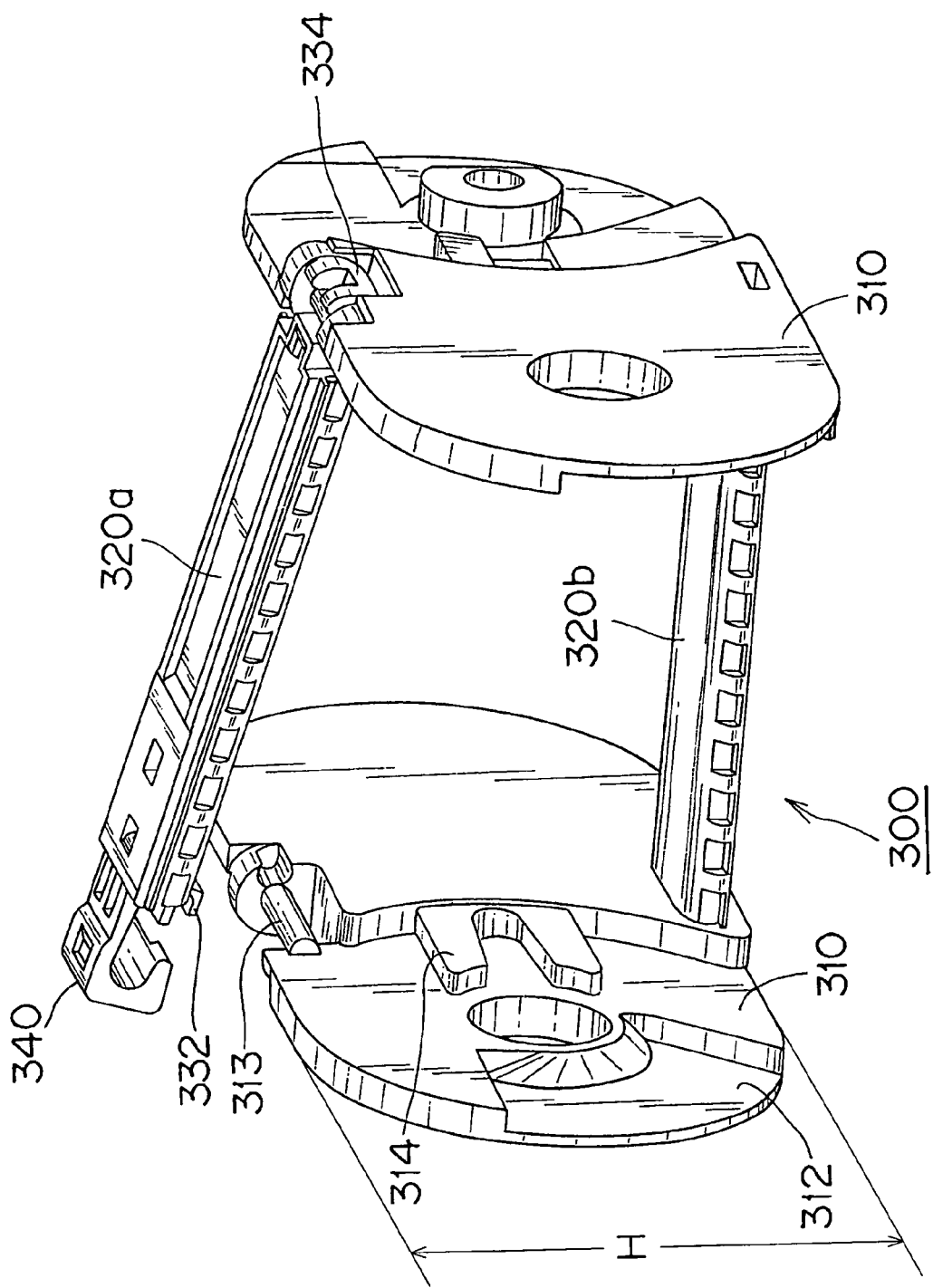
FIG. 6 is perspective view showing a link frame body of a cable protection and guide device relating to the present invention.
Figure 7:
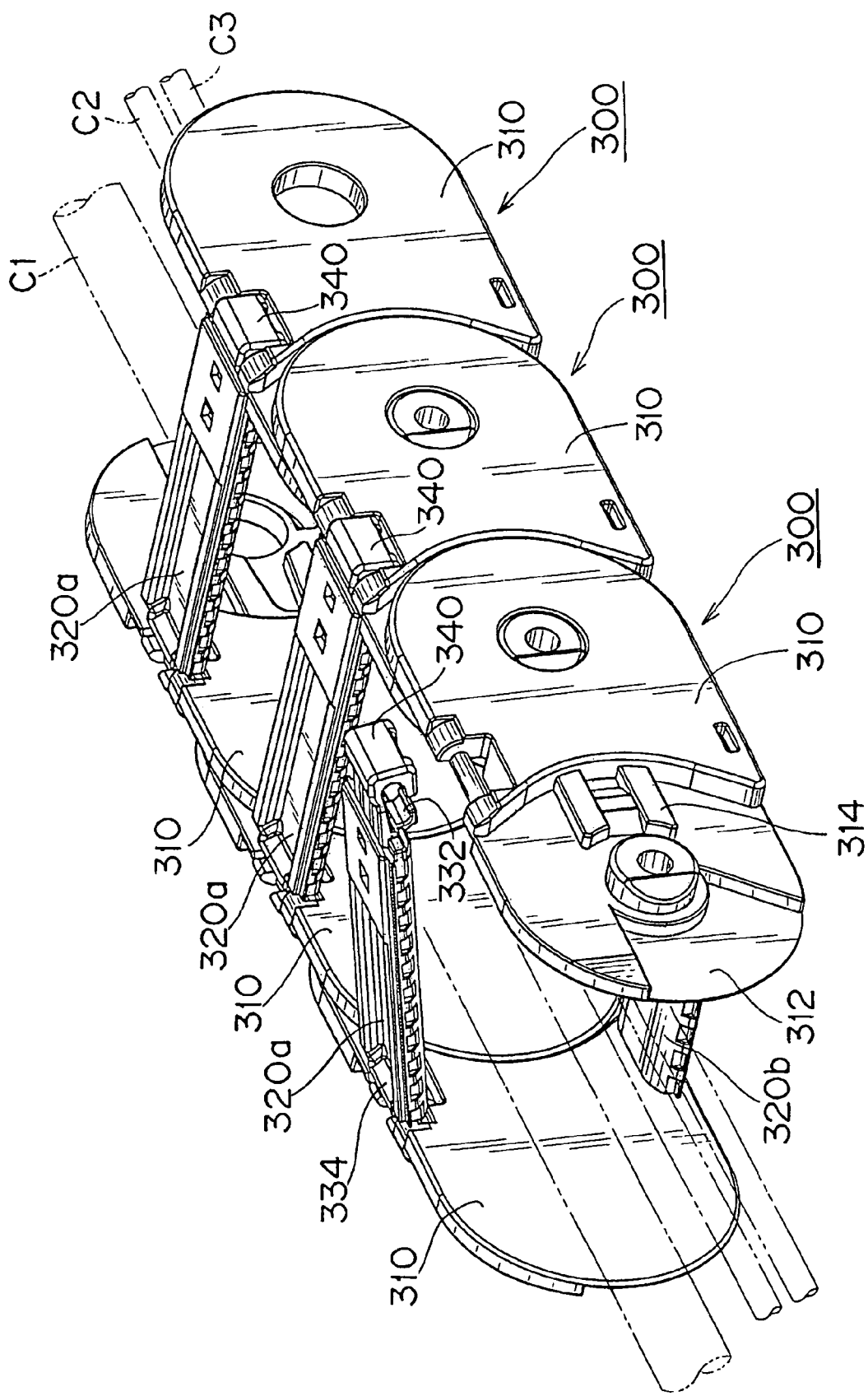
FIG. 7 is a perspective view showing three series of link frame bodies in the cable protection and guide device shown in FIG. 6.

FIG. 4 is a cross-sectional view of another example (example 2) of the present invention showing the same position as the cross-section III-III in FIG. 1. According to example 2 the central connecting rod 230 is formed in a wave shape in its cross-section. Since other points of example 2 are substantially the same construction as in the above-mentioned example 1, the details of example 2 are omitted and the same portions in example 2 as in example 1 are denoted by 200 plus the same two-digit in example 1.

In this manner, the cables do not tangle with each other and adjacent cables are slidable on each other to reduce wear of the cables. Further, an electric power cable, which supplies electricity, a hose which supplies air or liquid, and signal lines for transmitting outputs from a sensor or the like can be sorted into space partitioned into two sections. Thus the effects are very large.

According to the cable protection and guide device of the present invention, since the connecting rod integrally connected to the link plates is molded at a central portion along a height direction of the link plate, the link frame body is partitioned and a plurality of cables can be sorted. At the same time since the height of the link frame body can be increased, a number of cables can be accommodated into the link frame bodies. Therefore, the industrial applicability of the present invention is very high.

DESCRIPTION OF REFERENCE NUMERALS 100, 200, 300 . . . Link frame body
110*a*, 110*b*, 210*a*, 210*b*, 310*a*, 310*b* . . . Linkplate
112, 312 . . . Cutout portion
113, 213, 313 . . . Lockingpin
114, 314 . . . Convex portion
120*a*, 220*a*, 320*a* . . . Upper connecting rod
120*b*, 220*b*, 320*b* . . . Lower connecting rod
130, 230 . . . Central connecting rod
132, 232, 332 . . . Hook mechanism
134, 234, 334 . . . Hinge mechanism
140, 240, 340 . . . Rocking member
H, 2H . . . Height of link plate Those skilled in the art will readily recognize that the invention has been set forth by way of example only and that changes may be made to the invention without departing from the spirit and scope of the appended claims.

The invention claimed is:

1. A cable protection and guide device comprising a number of link frame bodies, each link frame body comprising a pair of right and left spaced link plates and upper and lower connecting rods respectively bridged on upper and lower edges of said link plates, said link bodies are connected to each other in the longitudinal direction of the device while restricting a flexion radius, a central connecting rod integrally molded with said pair of link plates connects said pair of link plates in a substantially centrally located portions thereof, said upper connecting rod and said lower connecting rod each include a first end and a second end, and, said first end includes a hinge mechanism and said second end includes an adjustable hook mechanism.

2. A cable protection and guide device according to claim 1, characterized in that said central connecting rod is molded in a wave shape in cross-section.

3. A cable protection and guide device comprising a plurality of link frame bodies, each of said link frame bodies comprises a pair of right and left spaced link plates, upper and lower connecting rods respectively bridged on upper and lower edges of said link plates, said link plates are connected to each other in the longitudinal direction of the device, a central connecting rod integrally molded with said pair of link plates and connects said pair of link plates in substantially centrally located portions of said link plates forming two passageways through said link frame bodies for separation of cables by type of cable, said upper connecting rod and said lower connecting rod each include a first end and a second end, and said first end includes a hinge mechanism and said second end includes an adjustable hook mechanism.

* * * * *

UNITED STATES PATENT AND TRADEMARK OFFICE
CERTIFICATE OF CORRECTION

| | | |
|---|---|---|
| PATENT NO. | : 7,243,486 B1 | |
| APPLICATION NO. | : 11/522718 | |
| DATED | : July 17, 2007 | |
| INVENTOR(S) | : Masaaki Ikeda, Shoichiro Komiya and Takayuki Matsuda | |

It is certified that error appears in the above-identified patent and that said Letters Patent is hereby corrected as shown below:

Column 5, Line 17, after "...", delete "Linkplate" and insert --Link plate--.
Column 5, Line 19, after "...", delete "Lockingpin" and insert --Locking pin--.

Column 6, Line 7, after "in", delete "a".

Signed and Sealed this

Fourth Day of September, 2007

JON W. DUDAS
*Director of the United States Patent and Trademark Office*